United States Patent [19]

Burns

[11] Patent Number: 4,865,683

[45] Date of Patent: Sep. 12, 1989

[54] METHOD AND APPARATUS FOR LASER PROCESS CONTROL

[75] Inventor: Leslie L. Burns, Saratoga, Calif.

[73] Assignee: Lasa Industries, Inc., San Jose, Calif.

[21] Appl. No.: 266,825

[22] Filed: Nov. 3, 1988

[51] Int. Cl.⁴ ................ H01L 21/306; B23K 9/00; B44C 1/22
[52] U.S. Cl. ............................ 156/627; 156/643; 156/654; 156/662; 156/345; 219/121.61; 219/121.8; 219/121.85
[58] Field of Search ............... 156/626, 627, 643, 654, 156/657, 662, 345, 272.8; 219/121.6, 121.61, 121.62, 121.63, 121.64, 121.68, 121.69, 121.74, 121.75, 121.78, 121.8, 121.83, 121.85; 427/53.1

[56] References Cited

U.S. PATENT DOCUMENTS

| | | | |
|---|---|---|---|
| 4,317,981 | 3/1982 | Chubarov et al. | 219/121.61 X |
| 4,398,094 | 8/1983 | Hiramoto | 219/121.61 X |
| 4,479,848 | 10/1984 | Otsubo et al. | 156/626 |
| 4,780,590 | 10/1988 | Griner et al. | 219/121.61 X |

Primary Examiner—William A. Powell
Attorney, Agent, or Firm—Cushman, Darby & Cushman

[57] ABSTRACT

A method and apparatus for controlling the energy of a laser beam on a workpiece includes a photodetector for generating an electrical signal which is proportional to the light reflected from the workpiece. The energy of the laser beam at the workpiece is increased from some predetermined low level until the photodetector senses an abrupt change in the reflected light. This change represents a changed state in the workpiece material that is exposed to the laser beam. The energy level at which the change takes place is used as a reference level for further laser processing.

23 Claims, 3 Drawing Sheets

METHOD AND APPARATUS FOR LASER PROCESS CONTROL

BACKGROUND OF THE INVENTION

This invention relates to an improved method and apparatus for controlling the energy level of a laser beam used in a materials processing machine.

Manufacturing and materials processing machines that use lasers for their source of processing energy have had little need for extreme accuracy in controlling the laser beam energy. In some resistor trimming machines, for example, a laser beam is used to ablate a resistor material while not unduly damaging the surrounding materials. There is a range of laser energies suitable for this process. The laser energy must be sufficient to cause removal of the material but must not exceed that which would cause undue damage to the surrounding materials. Within this range, some predetermined intermediate energy can be selected. However, in other applications, the energy of the laser beam must be carefully controlled. For example, techniques have been developed for forming very accurate, thin conductive lines on a semiconductor device. This is achieved by crystallization of amorphous silicon by a laser beam, as disclosed in copending U.S patent application Ser. No. 07/213,146, filed June 29, 1988, and which is assigned to the common assignee herewith. In such a technique, the amorphous silicon is crystallized by the laser beam to form a path upon which the conductive material can be deposited. If the path or line width grows too large because the energy density is high or too narrow because the energy density is low, unacceptable results will be obtained. It is, therefore, important that the laser beam energy be accurately controlled.

Although a laser beam generating system is set up to maintain constant energy during use, it is very difficult to determine and accurately control the energy density. This happens because of thermal drifts in the laser system, misfocusing, heating of some of the optical components thereof, and because the laser power level of laser systems varies a small amount with time in a random manner. Also, when used to crystallize amorphous silicon, the exact optical characteristics of the amorphous silicon varies depending upon its deposition conditions and the underlying substrate surface.

Accordingly, there is a need in the art for an improved method and apparatus for controlling the energy level of a laser beam. It is desirable that such a method and apparatus be automated and achieve an energy level that is optimum for the particular process.

SHORT STATEMENT OF THE INVENTION

The present invention is an improved method of controlling the energy level of a laser beam in equipment used in the manufacture of, among other things, semiconductor devices. In accordance with the invention, the laser beam scans or traverses over the surface of a workpiece, such as a semiconductor device. As the laser beam is scanning the workpiece, a portion of the reflected laser beam is detected by a large area photocell. As the laser beam energy is increased, the reflected light from the work surface increases proportionately as long as the surface stays in the same state.

In one preferred application of the invention, the laser beam scans selected areas of a semiconductor having an amorphous silicon layer thereon. The power of the laser beam is increased until the amorphous silicon changes to crystalline silicon and the power level is then held at that level. The laser power level at which crystallization occurs is determined by measuring the reflected light from the work surface. As the laser power is increased, the reflected light increases in proportion until the amorphous silicon changes to the crystalline state at which time the reflected light abruptly reduces. The laser power is then held at that level. As the characteristics of the amorphous silicon can vary from workpiece-to-workpiece, this application of the invention provides a method of setting the laser power level to achieve the desired process results.

BRIEF DESCRIPTION OF THE DRAWINGS

Other improvements, advantages and features of the present invention will become more fully apparent from the following detailed description of the preferred embodiment, the appended claims and the accompanying drawings in which:

DETAILED DESCRIPTION OF THE PREFERRED EMBODIMENT

Figure 1:
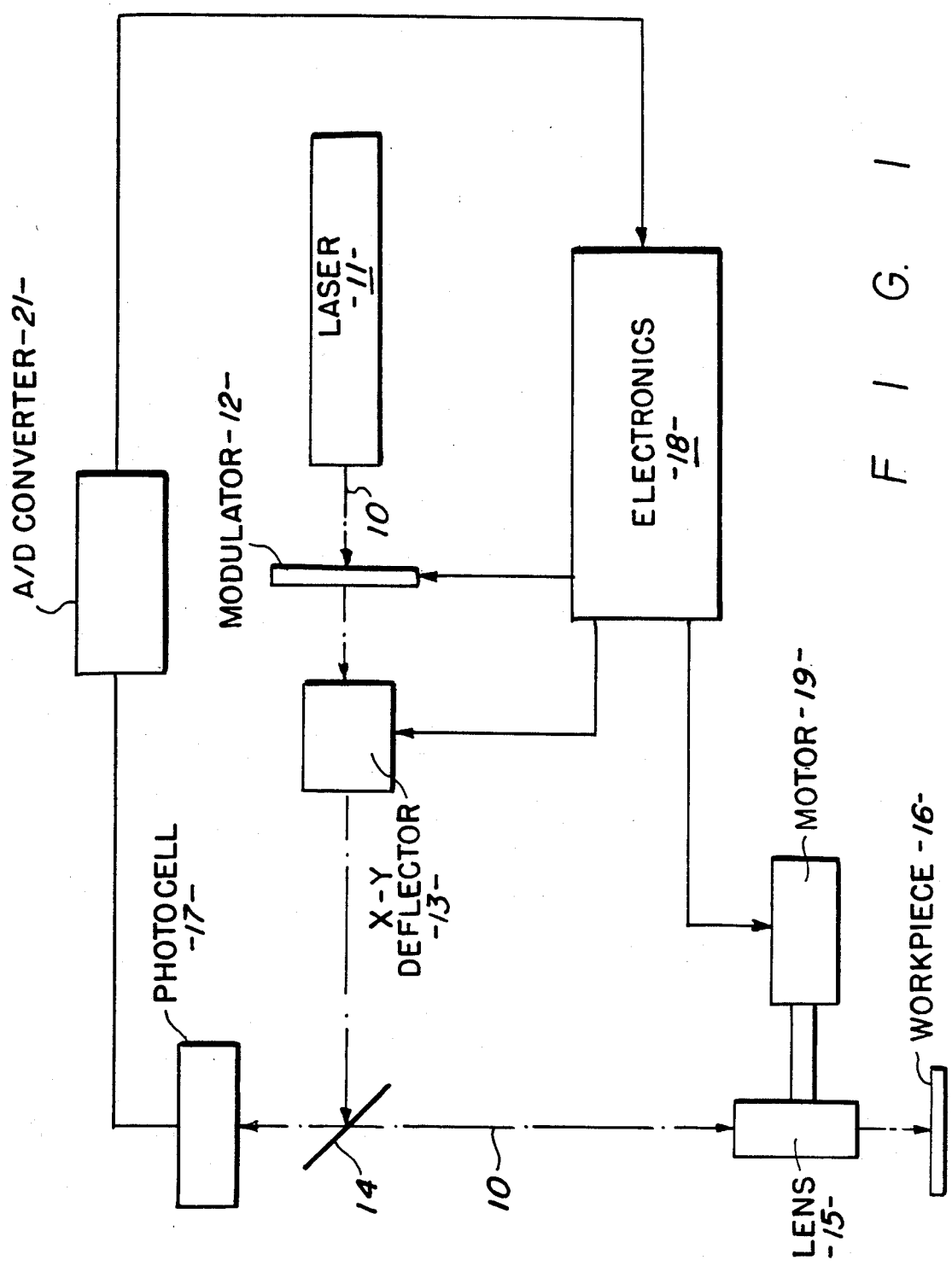
FIG. 1 is a schematic representation of one form of a laser power control arrangement according to the preferred embodiment of the present invention.

FIG. 1 illustrates the preferred embodiment of the present invention. It should be appreciated that the laser process control scheme according to the present invention can be used with many types of workpieces including semiconductor devices. The laser beam 10 is directed from a laser 11 through a modulator 12 and an X-Y deflector 13, to a beam splitting mirror 14. The beam is reflected from the mirror 14 through an objective focusing lens 15 onto the workpiece 16. A small percentage of the reflected laser beam passes through the mirror 14 and impinges on a photocell 17. The photocell 17 is of conventional design and preferably is a large area photocell. Beam focus is controlled by the position of the objective lens 15 which is positioned by motor 19 in a manner well known in the art. The positioning motor 19 is driven by signals from the electronic control system 18.

The electrical output of the photocell 17 is converted by an analog-to-digital converter 21 to a digital signal and stored in a computer contained in the electronic control system 18 of FIG. 1. The function of the electronic control system will be described below.

Figure 2:
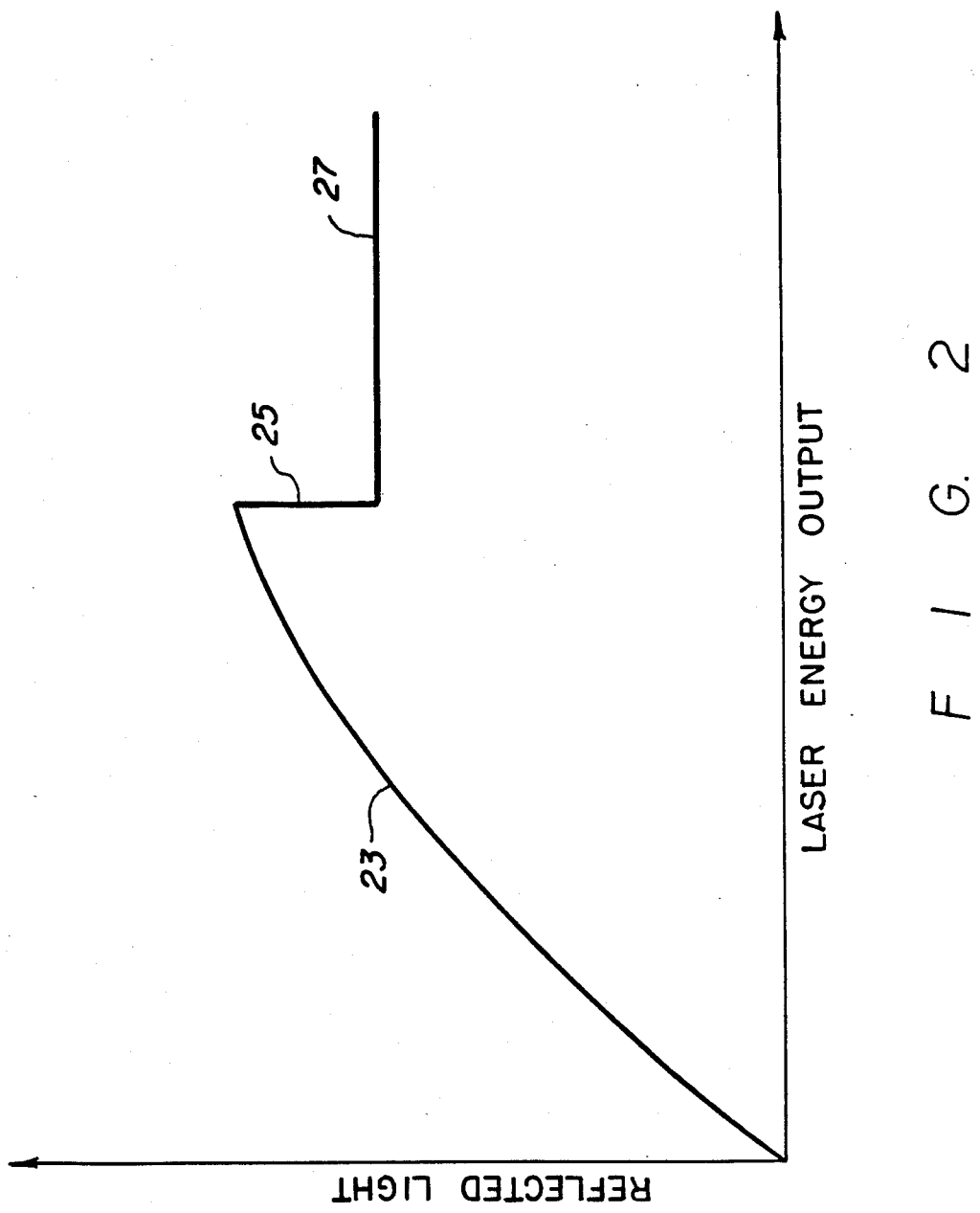
FIG. 2 is a plot of laser energy density versus reflected light according to the teachings of the present invention.

As the laser power is increased, the reflected light from the workpiece increases in direct proportion thereto as long as the surface of the workpiece remains in the same state. However, if the workpiece is a semiconductor having an amorphous silicon layer thereon, as the amorphous silicon on the die surface reaches the crystallization temperature and changes state, the reflected light decreases as illustrated in FIG. 2. In FIG. 2, the laser energy is plotted along the horizontal axis and the reflected light is plotted along the vertical axis. The reflected light increases in a substantially linear fashion with the laser energy as shown by section 23 of the plot until the crystallization temperature is reached.

When the crystallization temperature is reached, the reflected light abruptly decreases as shown by region 25 of the plot. As the laser power is further increased, the reflected light energy stabilizes to a new lower level as shown by region 27 of the plot.

The ideal power level for crystallizing the amorphous silicon is at a power level just beyond region 12 of FIG. 2. Thus, it can be seen that if the plot of FIG. 2 is stored in a computer for any given die that is to be processed, the computer ca set the proper power level to use for processing that die. This is done by generating the first derivative of the waveform shown in FIG. 2. The point 25, where the reflected light level decreases, will be where a peak derivative signal is generated. The algorithm that the computer uses determines where the magnitude of the first derivative of the reflected light curve is at a maximum and sets the laser power at a slightly higher value.

The curve of FIG. 2 can be obtained in a number of alternative ways. One method is to position the workpiece, such as a semiconductor die, so that the laser beam can be directed to an area where a bonding pad or other large area is to be written. The laser power is then increased, and the data of FIG. 2 obtained.

A second method is to position the laser at the beginning of a line that is to be written and to thereafter increase the laser power slowly until the step change in reflectivity occurs. A small amount is added to this level and the remainder of the line is scanned at this power level. Each line can be written following this method, i.e., by determining at the beginning point for each line the proper level at which crystallization occurs. The advantage of this second method is that the power level is dynamically adjusted for each line while the semiconductor workpiece is being written.

A third method of setting the laser power to the optimum level is to linearly increase the energy density with time at each point to be crystallized. In earlier designs, the laser was allowed to dwell on a given spot until the amorphous silicon was adequately crystallized. The dwell time was determined experimentally. In this third method, the laser energy density or power is increased at each spot until the step function in reflectivity occurs. Then the laser power is reduced, the beam is moved to the next position, and the process repeated. Since this process is very rapid and the computer operation is fast, the loss in time to implement this method is minimal when compared to the fixed laser power method previously used. Additionally, variations in the laser power caused by the acousto-optical modulators 12 not being perfect are eliminated since the power is dynamically adjusted for each spot that is written. One final advantage of this third method is that a minor variation in focus accuracy becomes less important since the laser power is always increased until crystallization occurs.

Although the circuit details have been described using a computer to determine when the reflectivity step occurs, it should be apparent that analog circuitry could also be used for this purpose. In fact, the third method described above would be best implemented in analog circuitry since it is desirable for it to be very fast. In an analog circuit for this purpose, the output from the photocell would be amplified and then differentiated. The output of the differentiator would be fed to a bistable flip-flop. When the differentiator output reached a preset level, the bistable circuit would switch and the laser power would be turned off. Enough time delay can be built into the circuitry so that the crystallization process can be completed. This delay can be caused by RC time constants or by a digital time delay circuit. The laser beam would then be moved to the next position and the sequence of events just described would be repeated by resetting the bistable circuit.

Figure 3:
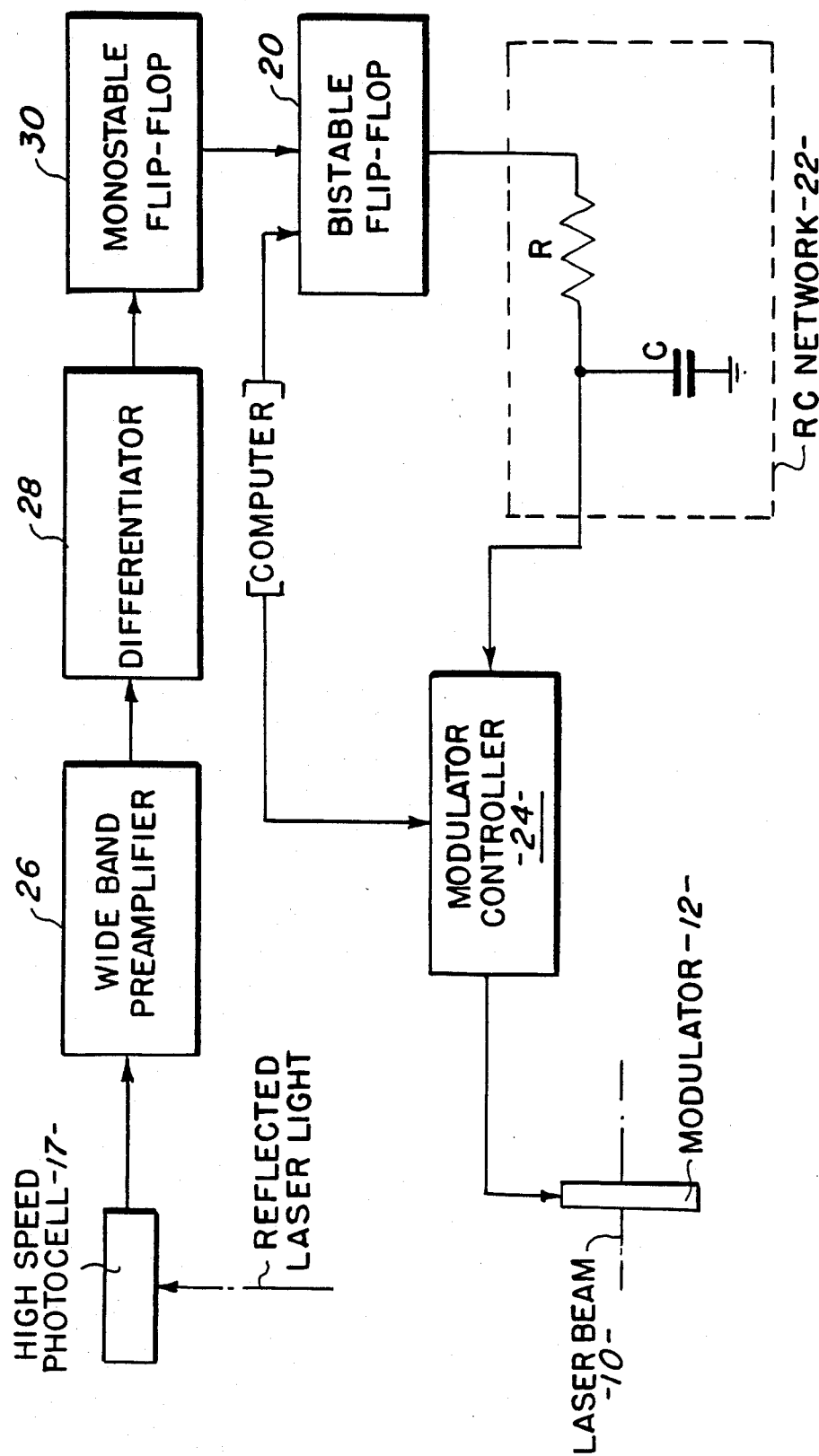
FIG. 3 illustrates in block diagram form the electronic processing circuitry of a preferred embodiment of the present invention.

This analog circuit can be understood by reference to the block diagram shown in FIG. 3. When a spot is to be written the computer sends a reset signal to the bistable flip-flop 20 which outputs a signal to the RC time constant network 22. The RC network 22 causes the signal from the bistable flip-flop 20 to rise gradually (in a relative sense) turning up the power in the laser beam 10 by means of the modulator 12 via modulator controller 24. When proper crystallization occurs in the amorphous silicon on the die, the reflected light step variation occurs causing the output of the high speed photocell 17 to output an abruptly decreased electrical signal to a wideband preamplifier 26. This signal decrease is separated from the overall electrical signal by the differentiator 28 and is used as an input to a monostable flip-flop 30. Upon receipt of the differentiated signal, monostable flip-flop 30 switches state. After a preset delay time, the monostable flip-flop 30 reverts to a stable state and causes the bistable flip-flop 20 to switch back to a beam-off state. The output of the bistable flip-flop 20 now reduces the laser power to below the writing threshold.

In FIG. 3, a delay monostable flip-flop 30 is shown for clarity. However, in practice, the delay induced by the RC network 22 is usually sufficient to allow for proper crystallization after the reflection step occurs. The input to the modulator control 24 from the computer is used to set the laser power to a level below the crystallization point of amorphous silicon before writing begins. The level set by the modulator controller 24 allows for laser vision and other operations connected with the processing of the die other than the actual writing.

The principles described above can be also used as a diagnostic tool for determining if the focusing system is working properly or if the amorphous silicon is varying from one die to the next. In the case of checking the focus, the lowest power level that causes the reflectivity step to occur coincides with the best focus condition since the power density is maximum when the focus is best. In the case of monitoring the characteristics of the amorphous silicon, if the power level when the reflectivity step occurs is the same for two different die when the system is known to be in proper focus, the optical characteristics of the two amorphous silicon layers are the same and conversely if the amorphous silicon layers are different.

What has been described is a superior and improved method of controlling laser power for a process that depends on the laser energy density. This new method eliminates drifts in laser power and ties the power setting directly to the desired physical process. This process could be for laser welding, laser ablation, laser crystallization or other processes. The method can be implemented so as to allow the laser power to be dynamically adjusted for each spot to be processed, or each line or each die, thus eliminating the effects of uncontrolled variations in laser power. The principles can also be used as a diagnostic tool for checking focus of the laser or for materials characterization.

While the preferred embodiment has been described in connection with the preferred embodiment thereof, it should be appreciated that other embodiments may be utilized in keeping with the spirit and scope of the present invention as defined by the appended claims.

What is claimed is:

1. A method of controlling the energy of a laser beam comprising the steps of:
    directing a laser beam onto a workpiece;
    increasing the laser energy from a predetermined low level;
    directing a portion of the reflected laser beam light from the workpiece onto a photocell, said photocell generating an electrical signal corresponding to the energy of said reflected laser beam;
    monitoring the generated electrical signal to determine any step function change in the reflected laser beam received by said photocell; and
    controlling in response to said monitored step change the laser beam energy at a selected level proximate the level at which the step function change occurred.

2. The method of claim 1 wherein the laser beam energy is controlled to a level above the level at which the step function change occurred.

3. The method of claim 1 wherein said monitoring step includes the step of differentiating the generated electrical signal to determine the laser beam energy at which said step function change in the reflected laser beam occurred.

4. The method of claim 1 wherein said monitoring step and said controlling step includes the use of a digital computer.

5. The method of claim 1 wherein said controlling step includes the steps of:
    amplifying the generated electrical signal;
    differentiating the electrical signal; and
    setting a flip-flop in response to said differentiated electrical signal to control the laser beam energy.

6. A method of crystallizing selected portions of a semiconductor device having an amorphous silicon layer thereon comprising the steps of:
    directing a laser beam onto a semiconductor substrate, the semiconductor substrate having a thin layer of amorphous silicon;
    increasing the laser energy from a predetermined low level;
    directing a portion of the reflected laser beam light from the workpiece onto a photocell, said photocell generating an electrical signal corresponding to the energy of said reflected laser beam;
    monitoring the generated electrical signal to determine any step function change in the reflected laser beam received by said photocell; and
    controlling in response to said monitored step change the laser beam energy at a selected level proximate the level at which the step function change occurred.

7. The method of claim 6 wherein the laser beam energy is controlled to a level above the level at which the step function change occurred.

8. The method of claim 6 wherein said monitoring step includes the step of differentiating the generated electrical signal to determine the laser beam energy at which said step function change in the reflected laser beam occurred.

9. The method of claim 6 wherein said monitoring step and said controlling step includes the use of a digital computer.

10. The method of claim 6 wherein said controlling step includes the steps of:
    amplifying the generated electrical signal;
    differentiating the electrical signal;
    setting a flip-flop in response to said differentiated electrical signal to control the laser beam energy.

11. The method of claim 6 wherein said amorphous silicon layer is less than 2,000 angstroms thick.

12. A laser beam energy control system comprising:
    a laser beam generator for generating a laser beam, said laser beam being directed onto a workpiece;
    means for converting laser beam light reflected from said workpiece to an electrical signal, said electrical signal being proportional to said reflected laser beam light;
    means for conveying at least a portion of the laser beam light reflected from said workpiece onto said converting means;
    means for detecting step variations in the level of said reflected light received by said converting means; and
    means responsive to said detecting means for controlling the laser beam energy at a level proximate the level at which the step variation occurs.

13. The laser beam energy control system of claim 12 wherein said detecting means includes an analog-to-digital converter, and means for differentiating a signal received by said connecting means.

14. The laser beam energy control system of claim 12 wherein said control means includes an acousto-optical modulator responsive to said detection means to control the laser beam energy.

15. The laser beam energy control system of claim 12 wherein said detecting means includes a differentiator for detecting step variations in the level of reflected light and said control means includes an analog circuit for controlling the laser beam energy in response to the detected step variation.

16. The laser beam energy control system of claim 12 wherein the detecting means is a photocell.

17. A laser beam energy control system for crystallization of selected portions of a semiconductor device having an amorphous silicon layer thereon comprising:
    a laser beam generator for generating a laser beam, said laser beam being directed onto a semiconductor device, the semiconductor device having a thin layer of amorphous silicon;
    a photo detector;
    means for conveying at least a portion of the laser beam light reflected from said workpiece onto said photo detector, said photo detector generating an electrical signal proportional to the reflected laser beam light;
    means for detecting step variations in the level of said reflected light received by said photocell; and
    means responsive to said detection means for controlling the laser beam energy at a level proximate the level at which the step variation occurs.

18. The laser beam energy control system of claim 17 wherein said detection means includes an analog-to-digital converter, and means for differentiating a signal generated by said photodetector.

19. The laser beam energy density control system of claim 17 wherein said control means includes an acousto-optical modulator responsive to said detection means to control the laser beam energy.

20. The laser beam energy control system of claim 17 wherein said detection means includes a differentiator for detecting step variations in the level of reflected light and said control means includes an analog circuit for controlling the laser beam energy in response to the detected step variation.

21. The laser beam energy control system of claim 17 wherein said amorphous silicon layer is less than 2,000 angstroms thick.

22. In a system for focusing a laser beam onto a workpiece having means for varying the focusing lens distance to said workpiece, the method of controlling the focus of said beam comprising the steps of:
  (a) focusing a laser beam onto a semiconductor substrate, the semiconductor substrate having a thin layer of amorphous silicon;
  (b) increasing the laser energy from a predetermined low level;
  (c) directing the reflected laser beam light onto a photocell, said photocell generating an electrical signal corresponding to the energy of said reflected laser beam.
  (d) monitoring the generated electrical signal to determine any step function change in the reflected laser beam received by said photocell;
  varying the distance of the laser beam focusing lens to the workpiece;
  repeating steps a–d above a selected number of times; and
  determining the minimum power level at which said step function change occurs, said minimum power level occurs when said laser beam is focused best onto said workpiece.

23. A method of characterizing a workpiece undergoing a laser process comprising the steps of:
  directing a laser beam onto the work piece;
  increasing the laser energy from a predetermined low level;
  directing the reflected laser beam light onto a photocell, said photocell generating an electrical signal corresponding to the energy of said reflected laser beam;
  monitoring the generated electrical signal to determine any step function change in the reflected laser beam received by said photocell; and
  comparing the energy level at which said step function change occurs with at least one other energy level at which said change occurred, and determining from said comparison the characteristics of said workpieces.

* * * * *